United States Patent
Misoczki et al.

(10) Patent No.: US 10,313,130 B2
(45) Date of Patent: Jun. 4, 2019

(54) HASH-BASED SIGNATURE BALANCING

(71) Applicant: Intel Corporation, Santa Clara, CA (US)

(72) Inventors: Rafael Misoczki, Hillsboro, OR (US); Steffen Schulz, Darmstadt (DE); Manoj R. Sastry, Portland, OR (US); Santosh Ghosh, Hillsboro, OR (US); Li Zhao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 15/277,462

(22) Filed: Sep. 27, 2016

(65) Prior Publication Data

US 2018/0091309 A1    Mar. 29, 2018

(51) Int. Cl.
*H04L 29/06*    (2006.01)
*H04L 9/32*    (2006.01)

(52) U.S. Cl.
CPC .......... *H04L 9/3247* (2013.01); *H04L 9/3242* (2013.01); *H04L 9/3252* (2013.01); *H04L 2209/30* (2013.01); *H04L 2209/38* (2013.01)

(58) Field of Classification Search
CPC .... H04L 9/3247; H04L 9/3242; H04L 9/3252
See application file for complete search history.

(56) References Cited

U.S. PATENT DOCUMENTS

| 2008/0095360 A1 | 4/2008 | Vuillaume et al. |
| 2011/0066859 A1 | 3/2011 | Iyer et al. |
| 2013/0083926 A1 | 4/2013 | Hughes et al. |
| 2016/0080156 A1 | 3/2016 | Kaliski, Jr. |

OTHER PUBLICATIONS

International Search Report and Written Opinion issued in PCT Application No. PCT/US2017/048661, dated Nov. 21, 2017, 9 pages.
McGrew, D., et al.: "Hash-Based Signatures draft-mcgrew-hash-sigs-04", Mar. 21, 2016, 43 pages.
FIPS Publication 180-4: "Secure Hash Standard (SHS)", National Institute of Standards and Technology (NIST), Mar. 2012.
FIPS Publication 202: SHA-3 Standard: "Permutation-Based Hash and Extendable-Output Functions", National Institute of Standards and Technology (NIST), Aug. 5, 2015.
"XMSS: Extended Hash-Based Signatures", Internet Research Task Force, Crypto Forum Research Group of the IETF®, Apr. 2015.

*Primary Examiner* — John B King
(74) *Attorney, Agent, or Firm* — Grossman, Tucker, Perreault & Pfleger, PLLC

(57) ABSTRACT

One embodiment provides a signer device. The signer device includes hash signature control logic and signer signature logic. The hash signature control logic is to retrieve a first nonce, to concatenate the first nonce and a message to be transmitted and to determine whether a first message representative satisfies a target threshold. The signer signature logic is to generate a first transmitted signature based, at least in part, on the first message representative, if the first message representative satisfies the target threshold. The hash signature control logic is to retrieve a second nonce, concatenate the second nonce and the message to be transmitted and to determine whether a second message representative satisfies the target threshold, if the first message representative does not satisfy the target threshold.

25 Claims, 2 Drawing Sheets

HASH-BASED SIGNATURE BALANCING

FIELD

The present disclosure relates to hash-based signatures, in particular to, hash-based signature balancing.

BACKGROUND

Digital signatures may be utilized for authentication, non-repudiation, and/or integrity. For example, a digital signature is configured to indicate to a recipient that a received a message was created by a known sender (i.e., authentication). In another example, the digital signature may be utilized to prevent a sender from denying that the sender sent the received message (i.e., non-repudiation). In another example, the digital signature may be configured to indicate that a received message was not altered in transit (i.e., integrity). Digital signatures may be associated with, for example, firmware updates, secure boot processes (i.e., root-of-trust) and/or communication between devices coupled by a network that may not be secure.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
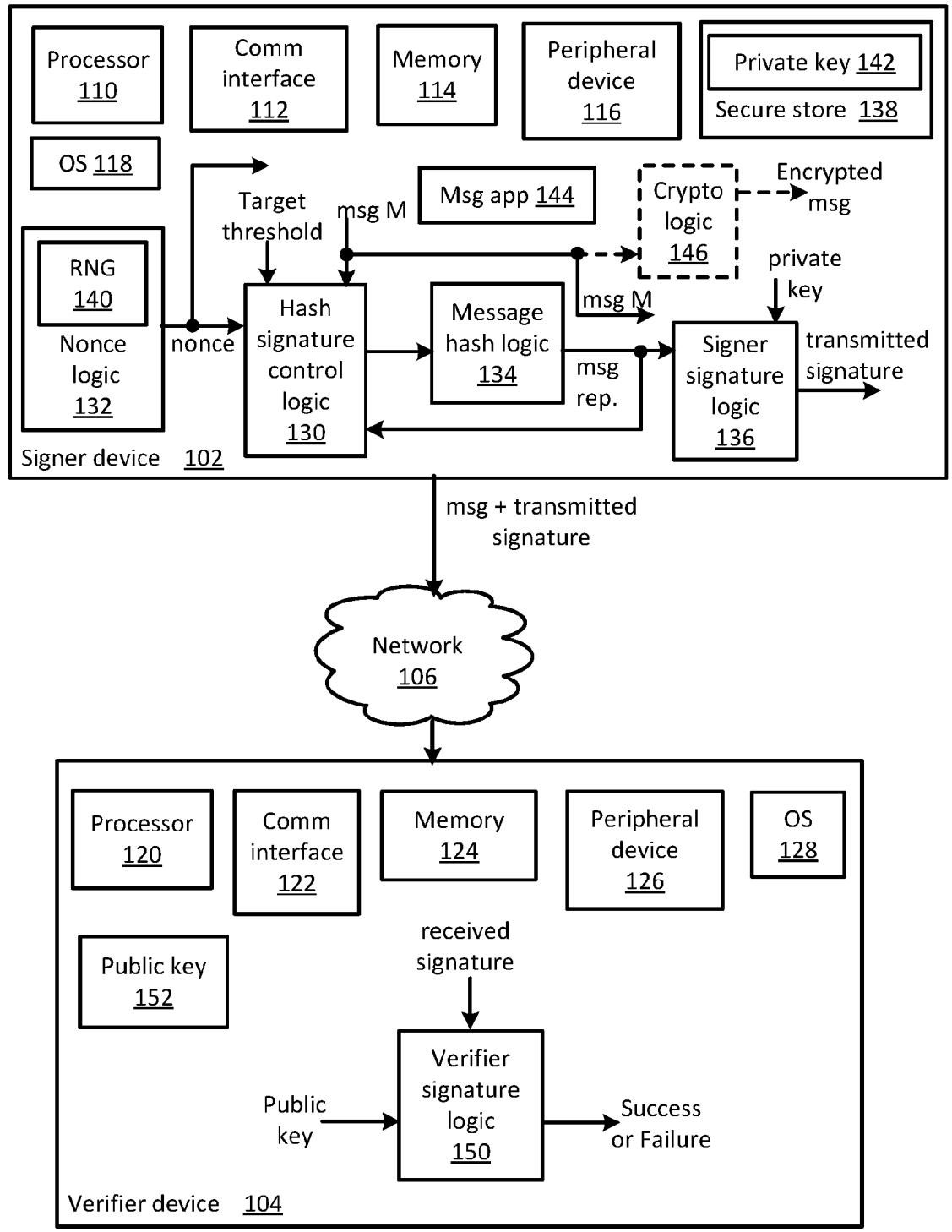
FIG. 1 illustrates a functional block diagram of a hash-based signature balancing system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Digital signatures utilize one or more cryptosystems (i.e., cryptographic algorithms). For example, a digital signature may utilize a RSA (Rivest Shamir Adleman) cryptosystem and/or an elliptic curve cryptosystem (ECC) to generate a signature. Hash-based signatures utilize hash functions to generate a signature. Hash-based signatures may be relatively more efficient than RSA and/or ECC with respect to memory footprint and latency and may further resist attacks from both classical and quantum computers.

Hash-based signature schemes correspond to asymmetric key cryptosystems. In other words, hash-based signature schemes utilize a private key to sign a message (i.e., to generate a signature to be transmitted with the message) and a public key to verify a corresponding received signature. A signer device may sign the message and a verifier device may be configured to verify the received signature. Generally, the signature to be transmitted may be generated by applying a hash function, or a chain function that contains a hash function (i.e., that encapsulates a number of calls to the hash function), to the private key a first number of times. A verification signature may be generated by applying the hash function, or the chain function that contains the hash function, to the received signature a second number of times. As used herein, "signature operations" include hash function operations or chain function operations that contain hash function operations. Respective values of the first and second numbers of times depend on the message to be signed. The verification signature may then be compared to the public key. A match may then correspond to verification success and a mismatch may correspond to verification failure. Depending on the content of the message to be signed, generating and/or verifying some hash-based signatures may be challenging for relatively resource-constrained devices, e.g., some Internet of Things (IoT) devices.

In hash-based signature schemes, the cost of signature generation and verification is related to the content (i.e., the pattern) of the message to be signed. Depending on the pattern of the message, the cost of signature verification may be more than the cost of signature generation or the cost of signature generation may be more than the cost of signature verification. Message content, and thus message pattern, are generally not controllable. Thus, for two devices (e.g., a signer device and a verifier device) with unequal resources, relatively more resource intensive operations may be performed on a relatively less capable (i.e., relatively more resource-constrained) device. As used herein, "resource-constrained" corresponds to a least capable device (i.e., most resource-constrained device) of a plurality of devices.

Generally, this disclosure relates to hash-based signature balancing. An apparatus, method and/or system are configured to generate one or more message representatives based, at least in part, on a message, M, and based, at least in part, on one or more nonces. Each message representative, m', is related to the message, M, concatenated with a selected nonce. In an embodiment, each message representative may correspond to a hash of the combination of the message, M, concatenated with the selected nonce.

The apparatus, method and/or system are further configured to select the nonce that yields a corresponding message representative, m', that achieves a target balance between the cost of signature generation and the cost of signature verification. The nonce selection procedure is a "sample-rejection procedure". In other words, one or more candidate nonces may be tested and rejected until a candidate nonce is found that yields a corresponding message representative, m', that achieves a target balance between the cost of signature generation and the cost of signature verification. As used herein, "cost" is related to a number of signature operations (i.e., hash function operations or chain function operations that include hash function operations) performed by a signature generator (e.g., signer device) and a number of signature operations performed by a signature verifier (e.g., verifier device).

In hash-based signature schemes, each message representative, m', may be split into a number, L, of message elements ("chunks"), $m_i$, as $m'=[m_1, \ldots, m_i, \ldots, m_L]$. Similarly, each private key, $s_k$, may be split into the number, L, of private key elements, $s_{ki}$, as $s_k=[s_{k1}, \ldots, s_{ki}, \ldots, s_{kL}]$ and each public key, $p_k$, may be split into the number, L, of public key elements, $p_{ki}$, as $p_k=[p_{k1}, \ldots, p_{ki}, \ldots, p_{kL}]$. Each message element, $m_i$, may each have a value between 0 and N−1. For example, N may correspond to a power of two, i.e., $N=2^w$, where w corresponds to a number of bits in each of the L message elements. For a Winternitz one time signature scheme, for example, w may correspond to the "Winternitz parameter". For example, w may be equal to 2, N equal to 4 and, thus, $0 \leq m_i \leq 3$. In another example, w may be equal to 4, N equal to $2^4=16$ and, thus, $0 \leq m_i \leq 15$. In another example, w may be equal to 16, N equal to $2^{16}=65,536$ and, thus, $0 \leq m_i \leq 65{,}535$. The value of the parameter L may be selected based, at least in part, on an associated latency and/or based, at least in part, on a signature size. In one example, L may be equal to 35. In another example, L may be equal to 68. In another example, L may be greater than or less than 68 and/or greater than or less than 35.

In one example, the number of signature operations (i.e., hash function operations or chain function operations that contain hash function operations) performed by the signer device corresponds to a sum, S, of $m_i$, $i=1, \ldots, L$, i.e., $$S = \sum_{i=1}^{L} m_i$$

and the number of signature operations performed by the verifier device corresponds to a sum, S', of $(N-m_i')$, $i=1, \ldots, L$, where $m_i'$ corresponds to a received message element, i.e., $$S' = \sum_{i=1}^{L} (N - m_i').$$

In another example, the number of signature operations performed by the signer device may correspond to S' (where S' is the sum over L of $(N-m_i)$) and the number of signature operations performed by the verifier device may correspond to S (where S is the sum over L of $m_i'$).

For a given message representative, m', the parameter w and the parameter L are related. For example, increasing the number of bits in each message element corresponds to a decrease in the number of message elements for a message representative of a given size. In another example, decreasing the number of bits in each message element corresponds to an increase in the number of message elements. A relatively higher number of bits in a message element may correspond to an increase in computational intensity associated with generating a private-public key pair, generating a signature and verifying a received signature while the corresponding decrease in the number of message elements corresponds to fewer message elements to hash. A relatively smaller number of message elements corresponds to a relatively smaller signature since the signature size is proportional to a product of the number, L, of message elements and a hash size (e.g., 256 bits for SHA2-256). Thus, the value of the number, L, and the number of bits, w, may be selected based, at least in part, on an associated latency and/or based, at least in part, on a signature size.

The target balance between the signer and the verifier may be represented by a threshold, T, where a corresponding target cost associated with the signer device is less than or equal to T(N−1)L or is greater than or equal to T(N−1)L. The corresponding target cost associated with the verifier device may then be greater than or equal to (1−T)(N−1)L or less than or equal to (1−T)(N−1). In other words, in a hash-based signature scheme, a total number of signature operations for each message element corresponds to a maximum value of each message element, i.e., N−1. The total number of signature operations for each message element is split between the signer and the verifier. For example, the signer may perform $m_i$ signature operations beginning with a private key and the verifier may perform $N-m_i$ signature operations beginning with a received message element $m_i'$ and ending with a verification message element. In another example, the signer may perform $N-m_i$ signature operations and the verifier may perform $m_i'$ signature operations. Verification is successful if each verification message element matches the corresponding public key element of the public key that corresponds to the private key used by the signer.

As used herein, T(N−1)L corresponds to a signer device threshold cost. It may be appreciated that a maximum signer device threshold cost is (N−1)L corresponding to T=1 and a maximum verifier device threshold cost is (N−1)L corresponding to T=0. The threshold, T, may be in the range of 0 to 1. A threshold, T, of about 0.5 may be considered a nominal threshold corresponding to an approximately equal cost between the signer device and the verifier device. A threshold, T, of less than 0.5 corresponds to a relatively smaller cost associated with the signer device and a correspondingly relatively higher cost associated with the verifier device. A threshold, T, greater than 0.5 corresponds to a relatively higher cost associated with the signer device and a correspondingly lower cost associated with the verifier device. The value of the threshold, T, may be selected based, at least in part, on relative capabilities of the signer device and the verifier device. For example, the threshold, T, may be in the range of 0.3 to 0.5 corresponding to 1−T in the range of 0.7 to 0.5. In another example, T may be in the range of 0.7 to 0.5 corresponding to 1−T in the range of 0.3 to 0.5. In another example, T may be less than 0.3 or greater than 0.7.

The value of the threshold, T, that may be selected is constrained by an amount of processing associated with identifying a nonce that achieves, i.e., satisfies, the selected threshold. A threshold, T, at or near 0.5 may be achieved by any uniformly distributed random nonce. A threshold, T, not near 0.5 may be achieved by relatively fewer uniformly distributed random nonces. A greater difference between T and 0.5 corresponds to fewer uniformly distributed random nonces. For example, a threshold, T, less than about 0.3 (corresponding to (1−T) greater than about 0.7) may be achieved by relatively fewer uniformly distributed random nonces compared to a threshold T in the range of 0.3 to 0.5. In another example, a threshold, T, greater than about 0.7 (corresponding to (1−T) less than about 0.3) may similarly be achieved by relatively fewer uniformly distributed random nonces compared to a threshold T in the range of 0.5 to 0.7. A relatively greater amount of processing may be associated with identifying at least one of the relatively fewer nonces. In other words, a relatively greater number of candidate nonces may be generated, attempted and rejected before identifying a nonce that achieves a target threshold.

Candidate nonces may be generated and attempted by the signer device. Thus, the range of possible values for the threshold, T, may be practically constrained by latency associated with identifying an appropriate nonce and/or capability of the signer device. For example, a relatively more capable signer device may support identifying an appropriate nonce for a target threshold relatively more distant from the nominal threshold and a relatively less capable signer device may support identifying an appropriate nonce for a target threshold relatively less distant from the nominal threshold.

Thus, the threshold, T, may be selected based, at least in part, on balancing a respective number of hash-based signature operations between a signer device and a verifier device and based, at least in part, on a latency associated with generating and identifying an appropriate nonce configured to achieve the threshold, T, for a given message, M.

Relatively more resource intensive operations may then be performed on a relatively more capable device.

FIG. 1 illustrates a functional block diagram of a hash-based signature balancing system 100 consistent with several embodiments of the present disclosure. System 100 may include a signer device 102, a verifier device 104 and a network 106. For example, the signer device 102 may be coupled to the verifier device 104 by the network 106. Network 106 may include a wireless and/or a wired network, as described herein. In one example, signer device 102, verifier device 104 and network 106 may be positioned in a common physical location, e.g., in a vehicle, in a building, in a common physical enclosure, etc. In another example, signer device 102 and verifier device 104 may be positioned physically separate from each other, coupled by network 106. In some embodiments, system 100 may include a plurality of signer devices and/or a plurality of verifier devices.

Signer device 102 is configured to generate a message to be transmitted to verifier device 104 via network 106. Signer device 102 may be further configured to identify a nonce configured to achieve a target threshold and to generate a message representative and a corresponding transmitted signature, as will be described in more detail below. Verifier device 104 is configured to receive the message and a received signature. Verifier device 104 may be further configured to verify the received signature, as will be described in more detail below. Signer device 102 may be relatively more capable, relatively less capable or similarly capable compared to verifier device 104.

Signer device 102 and/or verifier device 104, may include, but are not limited to, a mobile telephone including, but not limited to, a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.); an Internet of Things (IoT) networked device including, but not limited to, a sensor system that includes a plurality of sensors (e.g., Arduino 101* available from Intel®) and/or a sensor node that contains a sensor and is included in a sensor network (wired and/or wireless) that includes a plurality of networked sensor nodes; a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Sensors may include, but are not limited to environmental sensors (e.g., particulate, temperature, humidity, light, speed, etc.), accelerometers (e.g., vibration sensors), position sensors, motion detectors, timers, etc.

Signer device 102 includes a processor 110, a communication interface 112, memory 114 and a peripheral device 116. Signer device 102 may further include an operating system (OS) 118. Verifier device 104 includes a processor 120, a communication interface 122, a memory 124 and a peripheral device 126. Verifier device 104 may further include an OS 128. Each processor 110, 120 may include one or more processing units. Communication interfaces 112, 122 are configured to couple their respective devices 102, 104 to each other, wired and/or wirelessly, via network 106.

Signer device 102 may be relatively more capable, relatively less capable or similarly capable compared to verifier device 104. For example, a relatively less capable device may include a relatively less powerful processor (e.g., relatively fewer processing units, relatively smaller cache memory, if any, relatively lower clock speed, etc.), a relatively smaller memory and/or a relatively less powerful OS, if any, etc. A relatively more capable device may be configured to perform a relatively broader range of operations compared to a relatively less capable device. For example, a relatively less capable device may correspond to a dedicated device, e.g., a sensor node that contains, and is configured to support, a sensor. In another example, a relatively more capable device may correspond to multipurpose device, e.g., a computing system.

Peripheral device 116 and/or 126 may include, but are not limited to, a sensor, an external storage device (e.g., a hard disk drive (HDD), a solid-state drive (SDD)), a user interface (e.g., a keyboard, a mouse, a display, a touch sensitive display, etc.), etc. For example, if signer device 102 corresponds to the relatively less capable device, then peripheral device 116 may correspond to a sensor, as described herein. In another example, if signer device 102 corresponds to the relatively more capable device, then peripheral device 126 may correspond to an external storage device and/or a user interface.

Signer device 102 includes hash signature control logic 130, nonce logic 132, message hash logic 134 and signer signature logic 136. Signer device 102 further includes a secure store 138 configured to store at least one private key, e.g., private key 142. Signer device 102 may include a message application (Msg App) 144 configured to generate a message, M, and cryptographic logic (Crypto logic) 146, configured to encrypt, e.g., message M, to produce an encrypted message (Encrypted msg). Verifier device 104 includes verifier signature logic 150 and may include a public key, e.g., public key 152. Hash signature control logic 130 is configured to manage operations associated with generating a message representative that achieves a target threshold, i.e., target balance, of hash-based signature operations between signer device 102 and verifier device 104.

Nonce logic 132 may include a random number generator 140 configured to generate a plurality of random numbers. For example, when signer device 102 has a message, M, to send, hash signature control logic 130 may be configured to retrieve, i.e., sample, a random number from nonce logic 132. In an embodiment, random number generator 140 may correspond to a true random number generator. In another embodiment, random number generator 140 may correspond to a pseudorandom number generator.

A size (e.g., a number of bits) of each random number may be adjustable by hash signature control logic 130. The size of the random number and thus the size of the nonce may be related to a security level. For example, for 128-bit security, the size of the nonce may correspond to 128 bits. In another example, for 256-bit security, the size of the nonce may be 256 bits. A generated random number sampled uniformly at random may then correspond to a nonce, e.g., a candidate nonce. As used herein, "sampled uniformly at random" corresponds to a random number with uniform distribution. In other words, each possible random number has a corresponding equal likelihood of being sampled, i.e., selected. As used herein, a candidate nonce is a nonce that may or may not support achieving a target threshold, as described herein.

Hash signature control logic 130 may be configured to receive a message, M, from, e.g., message app 144. In an embodiment, message app 144 may be configured to retrieve data and/or information from, e.g., peripheral device 116, and to generate message M based, at least in part, on the retrieved data and/or information. For example, signer device 102 may correspond to a sensor node. In another embodiment, message app 144 may be configured to generate the message, M, based, at least in part, on operation of message app 144. For example, signer device 102 may correspond to a sensor system controller, message app 144 may correspond to a sensor system controller application and verifier device 104 may correspond to a sensor node.

Hash signature control logic 130 is configured to determine the signer device target threshold cost, $T(N-1)L$. Thus, hash signature control logic 130 is further configured to receive the target threshold, T. The signer device target threshold cost may be determined based, at least in part, on the target threshold, T. For example, if the signer device 102 is the relatively less capable device compared to the verifier device 104, then T may be less than or equal to 0.5. In another example, if the signer device 102 is the relatively more capable device, then T may be greater than or equal to 0.5.

Hash signature control logic 130 may be further configured to retrieve a candidate nonce from nonce logic 132. As used herein, a candidate message representative corresponds to a message representative that may or may not achieve the target threshold, as described herein. In other words, a candidate message representative may be evaluated by, e.g., hash signature control logic 130, to determine whether corresponding message elements ($m_i$, i=1, . . . , L) achieve the target threshold.

Hash signature control logic 130 is configured to concatenate the message M and the candidate nonce. For example, the candidate nonce may be appended to the message M (e.g., M∥nonce where ∥ corresponds to concatenate). In another example, the candidate nonce may be prepended to the message M (e.g., nonce∥M). A position of the nonce with respect to the message M may be known to the verifier device 104, in advance of receiving a signature.

Hash signature control logic 130 may then provide the concatenated message, M, and candidate nonce to message hash logic 134. Message hash logic 134 is configured to hash (i.e., apply a hash function to) the concatenated message M and candidate nonce to generate a candidate message representative (msg rep), m'. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

The candidate message representative may then be provided to and/or retrieved by hash signature control logic 130. In an embodiment, hash signature control logic 130 may be configured to determine a sum, S, of the number L candidate message elements, $m_i$, of candidate message representative, m'. In another embodiment, hash signature control logic 130 may be configured to determine a sum, S', for the number L candidate message elements, $m_i$, as the sum of ($N-m_i$) over L. Each candidate message element, $m_i$, may have a value between 0 and N−1, as described herein, thus, S (or S') may have a value between 0 and $L(N-1)$.

Hash signature control logic 130 is further configured to compare the sum, S, of the candidate message elements (i.e., the candidate message element values), or the sum, S', of the difference between N and each candidate message element (i.e., $N-m_i$, i=1 to L), to the signer device target threshold cost, $T(N-1)L$. If the signer device 102 is the relatively more constrained device (i.e., the relatively less capable device), then, if the sum, S (or S'), is greater than the signer device target threshold cost, the candidate nonce may be rejected. A new candidate nonce may then be retrieved (i.e., selected and/or sampled) and the process may repeat. A new candidate nonce may be selected and the process may repeat until the sum, S (or S'), is less than or equal to the signer device target threshold cost. If the signer device 102 corresponds to the relatively less constrained device (i.e., the relatively more capable device) then, if the sum, S (or S'), is less than the signer device threshold cost, then the candidate nonce may be rejected, a new candidate nonce may be selected and the process may repeat until the sum, S (or S'), is greater than or equal to the signer device threshold cost.

A selected message representative, m', determined, based at least in part, on the selected nonce may then be provided to the signer signature logic 136. For example, the message representative, m', may be provided to the signer signature logic 136 by hash signature control logic 130. The signer signature logic 136 may be further configured to receive a private key. For example, the private key may be retrieved from secure store 138. Signer signature logic 136 may be configured to split the message representative, m', into a number, L, of message elements, $m_i$, as described herein. Signer signature logic 136 may be further configured to split the private key, $s_k$, into the number L private key elements, i.e., $s_k = [s_{k1}, \ldots, s_{kL}]$.

Signer signature logic 136 may then be configured to generate a signature to be transmitted, i.e., a transmitted signature. The transmitted signature may include the number, L, of transmitted signature elements with each transmitted signature element corresponding to a respective message element. For example, for each message element, $m_i$, signer signature logic 136 may be configured to perform a selected signature operation on each private key element, $s_{ki}$ of the private key, $s_k$, a respective number of times related to a value of each message element, $m_i$ included in the message representative m'. For example, signer signature logic 136 may be configured to apply a selected hash function to a corresponding private key element, $s_{ki}$, $m_i$ times. In another example, signer signature logic 136 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., draft draft-irtf-cfrg-xmss-hash-based-signatures-00, titled "XMSS: Extended Hash-Based Signatures, released April 2015, by the Internet Research Task Force, Crypto Forum Research Group of the IETF® and/or later and/or related versions of this informational draft, such as draft draft-irtf-cfrg-xmss-hash-based-signatures-06, released June 2016.

Winternitz OTS is configured to generate a signature and verify a received signature utilizing a hash function. Winternitz OTS is further configured to use the private key and, thus, each private key element, $s_{ki}$, one time. For example, Winternitz OTS may be configured to apply a hash function to each private key element, $m_i$ or $N-m_i$ times to generate a signature and to apply the hash function to each received message element $N-m_i'$ or $m_i'$ times to generate a corresponding verification signature element. The Merkle many time signature scheme is a hash-based signature scheme that utilizes an OTS and may use a public key more than one time. For example, the Merkle signature scheme may utilize Winternitz OTS as the one time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme. Hash-based signature balancing, as described herein, may similarly balance chain function operations.

After the signature is generated, the message, M, nonce and transmitted signature may then be sent, i.e., transmitted, by signer device 102, e.g., communication interface 112, to verifier device 104 via network 106. In an embodiment, the message, M, may not be encrypted prior to transmission. In another embodiment, the message, M, may be encrypted prior to transmission. For example, the message, M, may be encrypted by Crypto logic 146 to produce an encrypted message. A received message, received nonce and received signature may then be received by verifier device 104. Prior to transmission of messages, nonces and corresponding signatures, a public key, e.g., public key 152, that corresponds to private key 142 may be provided to verifier device 104. The public key, $p_k$, is configured to contain the number L of public key elements, i.e., $p_k=[p_{k1}, \ldots, p_{kL}]$. The public key 152 may be stored, for example, to memory 124.

Verifier signature logic 150 may be configured to retrieve the public key 152. Verifier signature logic 150 may be further configured to retrieve and/or receive, the received message, the received nonce and the received signature. For example, the received message, the received nonce and the received signature may be retrieved from communication interface 122 and/or memory 124. The received signature is configured to contain the number, L, received message elements, $m_i'$. Verifier signature logic 150 is configured to generate a received message representative based, at least in part, on the received message and based, at least in part, on the received nonce. For example, the received message representative may be determined by concatenating the received message and the received nonce and then hashing the concatenated received message and received nonce, as described herein. The hash function, or the chain function that contains the hash function(s), used to determine the message representative corresponds to the hash function, or the chain function that contains the hash function(s), used to determine the received message representative.

Verifier signature logic 150 is configured to generate a verification signature based, at least in part, on the received signature and based, at least in part, on the received message representative. For example, verifier signature logic 150 may configured to perform the same signature operations, i.e., apply the same hash function or chain function as applied by signer signature logic 136, to each received message element a number, $N-m_i'$ (or $m_i'$), times to yield a verification message element. Whether a verification signature, i.e., each of the L verification message elements, corresponds to a corresponding public key element, $p_{ki}$, may then be determined. For example, verifier signature logic 150 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

If the verifier device 104 is the relatively more capable device (compared to the signer device 102), then verifier signature logic 150 may perform relatively more signature operations compared to signer signature logic 136. If the verifier device 104 is the relatively less capable device, then verifier signature logic 150 may perform relatively fewer signature operations compared to signer signature logic 136. The number of signature operations performed by verifier signature logic 150 corresponds to the sum, S', i.e., the sum for i=1 to L of $(N-m_i')$ or the sum S, i.e., the sum of $m_i'$ for i=1 to L, as described herein.

Thus, a cost associated with generating and verifying a hash-based signature may be distributed between a signer device and a verifier device. A relatively less capable device may be configured to perform a relatively smaller portion of the signature operations and a relatively more capable device may be configured to perform a relatively larger portion of the signature operations. The distribution is related to the threshold, T, and the selected nonce configured to achieve an associated cost for a given a message, M.

Figure 2:
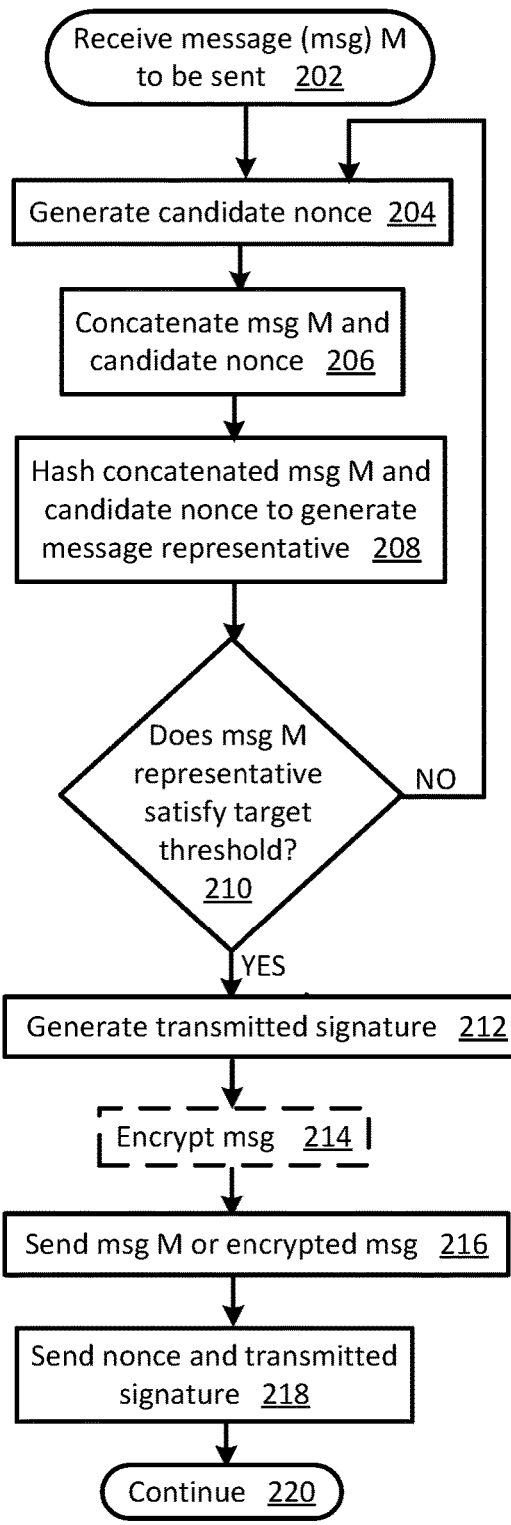
FIG. 2 is a flowchart of hash-based signature balancing operations according to various embodiments of the present disclosure.

FIG. 2 is a flowchart 200 of hash-based signature balancing operations according to various embodiments of the present disclosure. In particular, the flowchart 200 illustrates identifying an appropriate nonce base, at least in part, on a target threshold, T. The operations may be performed, for example, by hash signature control logic 130, nonce logic 132, message hash logic 134 and/or signer signature logic 136 of signer device 102 of FIG. 1.

Operations of this embodiment may begin with receiving a message (msg) M to be sent at operation 202. A candidate nonce may be generated in operation 204. The message and the candidate nonce may be concatenated in operation 206. The concatenated message and candidate nonce may be hashed to generate a message representative at operation 208. Whether the message representative satisfies a target threshold may be determined at operation 210. If the message representative does not satisfy the target threshold, then program flow may return to operation 204 and a new candidate nonce may be generated. If the message representative satisfies the target threshold, then a transmitted signature may be generated at operation 212. For example, the candidate nonce may be selected and the transmitted signature generated based, at least in part, on the message representative determined based, at least in part, on the selected nonce. In some embodiments, the message to be sent may be encrypted at operation 214. In some embodiments, the message to be sent may not be encrypted. The message or encrypted message may then be sent at operation 216. The nonce and the transmitted signature may be sent, i.e., transmitted, at operation 218. Program flow may then continue in operation 220.

Thus, one or more candidate nonces may be generated until a corresponding message representative satisfies a target threshold. A hash-based signature scheme may then be applied to the message representative to generate a transmitted signature. The message, nonce and transmitted signature may then be transmitted to a verifier device. The target threshold is configured to distribute costs associated with generating and verifying a hash-based signature between a signer device and a verifier device so that relatively more resource intensive operations may then be performed on a relatively more capable device.

Figure 3:
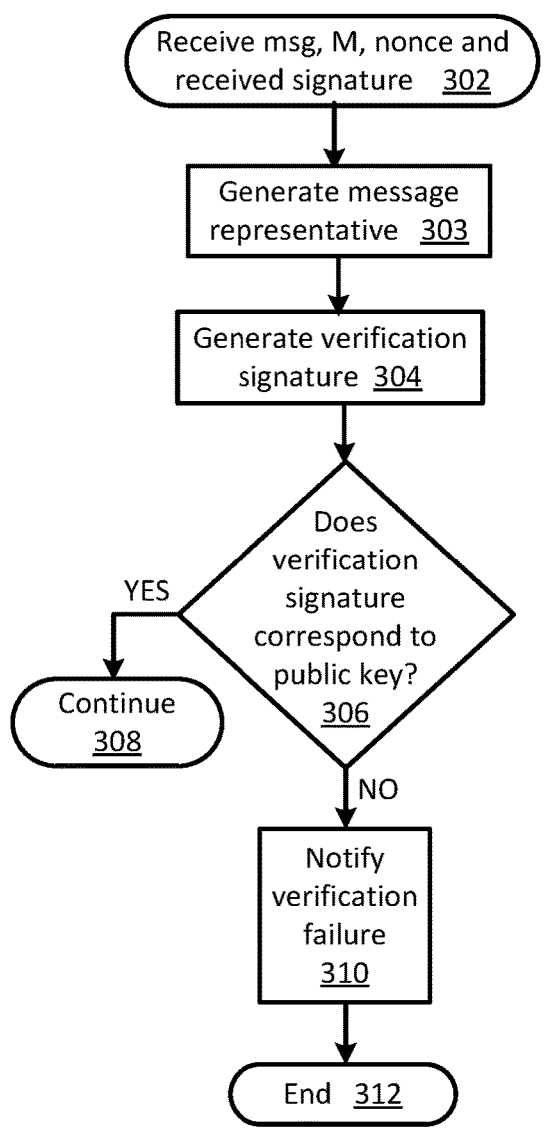
FIG. 3 is a flowchart of signature verification operations according to various embodiments of the present disclosure.

FIG. 3 is a flowchart 300 of signature verification operations according to various embodiments of the present disclosure. In particular, the flowchart 300 illustrates an attempt to verify a received signature. The operations may be performed, for example, by verifier signature logic 150 of verifier device 104 of FIG. 1.

Operations of this embodiment may begin with receiving a message, a nonce and a received signature at operation 302. A message representative may be generated at operation 303. For example, the received message and received nonce may be concatenated and the concatenated received message and nonce may be hashed to generate a received message representative. A verification signature may be generated at operation 304. The verification signature may be generated based, at least in part, on the received signature and based, at least in part, on the received message representative. For example, the verification signature may be generated by applying a same hash function and/or chain function, as applied by, e.g., signer signature logic 136, to the received message representative, m', to generate the transmitted signature. For each element of the verification signature, the hash function or chain function may be applied a respective number of times determined by the corresponding element of the received message representative. Whether a verification signature corresponds to a public key may be determined at operation 306. For example, each element of the verification signature may be compared to a corresponding element of the public key. If the verification signature corresponds to the public key, then program flow may continue at operation 308. If the verification signature does not correspond to the public key then a verification failure may be notified at operation 310. Program flow may then end at operation 312.

Thus, whether a received signature corresponds to a transmitted signature may be verified.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3 and/or other operations described herein may be combined in a manner not specifically shown in any of the drawings, and such embodiments may include less or more operations than are illustrated in FIGS. 2 and 3. Thus, claims directed to features and/or operations that are not exactly shown in one drawing are deemed within the scope and content of the present disclosure.

Generally, this disclosure relates to hash-based signature balancing. An apparatus, method and/or system are configured to generate one or more message representatives based, at least in part, on a message, M, and based, at least in part, on one or more nonces. Each message representative, m', is related to the message, M, concatenated with a selected nonce. The apparatus, method and/or system are further configured to select the nonce that yields a corresponding message representative, m', that achieves a target balance between the cost of signature generation and the cost of signature verification.

The target balance between the signer and the verifier may be represented by a threshold, T, where a corresponding target cost associated with the signer device is less than or equal to $T(N-1)L$ or is greater than or equal to $T(N-1)L$. The corresponding target cost associated with the verifier device may then be greater than or equal to $(1-T)(N-1)L$ or less than or equal to $(1-T)(N-1)$. The threshold, T, may be selected based, at least in part, on balancing a respective number of hash-based signature operations, i.e., hash function operations and/or chain function operations, between a signer device and a verifier device and based, at least in part, on a latency associated with generating and identifying an appropriate nonce configured to achieve the threshold, T, for a given message, M. Relatively more resource intensive operations may then be performed on a relatively more capable device.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS), e.g., OS 118 and/or 128 may be configured to manage system resources and control tasks that are run on, e.g., signer device 102 and/or verifier device 104. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Network 106 may include a packet switched network. Signer device 102, verifier device 104 and/or network 106 may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, signer device 102, verifier device 104 and/or network 106 may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, signer device 102, verifier device 104 and/or network 106 may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, signer device 102, verifier device 104 and/or network 106 may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Signer device 102, verifier device 104 and/or network 106 may comply and/or be compatible with one or more communication specifications, standards and/or protocols.

For example, signer device 102, verifier device 104 and/or network 106 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, signer device 102, verifier device 104 and/or network 106 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, signer device 102, verifier device 104 and/or network 106 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, signer device 102, verifier device 104 and/or network 106 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Signer device 102, verifier device 104 and/or network 106 may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, signer device 102, verifier device 104 and/or network 106 may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, signer device 102, verifier device 104 and/or network 106 may comply and/or be compatible with UMTS (Universal Mobile Telecommunication System) standard and/or later and/or related versions of these standards.

Signer device 102, verifier device 104 and/or network 106 may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, signer device 102, verifier device 104 and/or network 106 may comply and/or be compatible with IEEE standard: IEEE Std 802.16™-2012, title: IEEE Standard for Air Interface for Broadband Wireless Access Systems, released August 2012, and/or related and/or later versions of this standard. In another example, signer device 102, verifier device 104 and/or network 106 may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 114, 124 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to hash-based signature balancing, as discussed below.

Example 1

According to this example, there is provided a signer device. The signer device includes hash signature control logic and signer signature logic. The hash signature control logic is to retrieve a first nonce, to concatenate the first nonce and a message to be transmitted and to determine whether a first message representative satisfies a target threshold. The signer signature logic is to generate a first transmitted signature based, at least in part, on the first message representative, if the first message representative satisfies the target threshold. The hash signature control logic is further to retrieve a second nonce, concatenate the second nonce and the message to be transmitted and to determine whether a second message representative satisfies the target threshold, if the first message representative does not satisfy the target threshold,

Example 2

This example includes the elements of example 1, and further includes a nonce logic to generate the first nonce.

Example 3

This example includes the elements of example 1, and further includes message hash logic to hash the concatenated first nonce and message to be transmitted to generate the first message representative.

Example 4

This example includes the elements of example 1, and further includes a communication interface to transmit the first nonce, the message to be transmitted and the first transmitted signature, if the first message representative satisfies the target threshold.

Example 5

This example includes the elements according to any one of examples 1 to 4, wherein generating the first transmitted signature includes performing a selected signature operation on each private key element of a private key a respective number of times related to a value of each message element included in the first message representative.

Example 6

This example includes the elements according to any one of examples 1 to 4, wherein the first transmitted signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 7

This example includes the elements according to any one of examples 1 to 4, wherein the target threshold is in the range of 0.5 to 0.7 or is in the range of 0.3 to 0.5.

Example 8

This example includes the elements of example 5, wherein each message element includes 2, 4 or 16 bits.

Example 9

This example includes the elements of example 5, wherein the first message representative includes 35 or 68 message elements.

Example 10

This example includes the elements of example 2, wherein the nonce logic includes a pseudorandom number generator to provide a plurality of random numbers with a uniform distribution.

Example 11

According to this example, there is provided a hash-based signature method. The hash-based signature method includes retrieving, by hash signature control logic, a first nonce; concatenating, by the hash signature control logic, the first nonce and a message to be transmitted; determining, by the hash signature control logic, whether a first message representative satisfies a target threshold; and generating, by signer signature logic, a first transmitted signature based, at least in part, on the first message representative, if the first message representative satisfies the target threshold. The method further includes retrieving, by the hash signature control logic, a second nonce, concatenating, by the hash signature control logic, the second nonce and the message to be transmitted and determining, by the hash signature control logic, whether a second message representative satisfies the target threshold, if the first message representative does not satisfy the target threshold.

Example 12

This example includes the elements of example 11, and further includes generating, by a nonce logic, the first nonce.

Example 13

This example includes the elements of example 11, and further includes hashing, by message hash logic, the concatenated first nonce and message to be transmitted to generate the first message representative.

Example 14

This example includes the elements of example 11, and further includes transmitting, by a communication interface, the first nonce, the message to be transmitted and the first transmitted signature, if the first message representative satisfies the target threshold.

Example 15

This example includes the elements of example 11, wherein generating the first transmitted signature includes performing a selected signature operation on each private key element of a private key a respective number of times related to a value of each message element included in the first message representative.

Example 16

This example includes the elements of example 11, wherein the first transmitted signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 17

This example includes the elements of example 11, wherein the target threshold is in the range of 0.5 to 0.7 or is in the range of 0.3 to 0.5.

Example 18

This example includes the elements of example 15, wherein each message element includes 2, 4 or 16 bits.

Example 19

This example includes the elements of example 15, wherein the first message representative includes 35 or 68 message elements.

Example 20

This example includes the elements of example 12, and further includes providing, by a pseudorandom number generator, a plurality of random numbers with a uniform distribution.

Example 21

This example includes the elements of example 11, and further includes transmitting, by a signer device, the first transmitted signature, the first nonce and the message to be transmitted; verifying, by a verifier device, a received signature; and coupling, by a network, the signer device and the verifier device.

Example 22

This example includes the elements of example 21, and further includes receiving, by verifier signature logic, the received signature, a received nonce and a received message; and determining, by the verifier signature logic, whether a verification signature corresponds to a public key, the verification signature related to the received signature.

Example 23

This example includes the elements of example 22, and further includes generating, by the verifier signature logic, the verification signature based, at least in part, on the received signature and based, at least in part, on the received message representative.

Example 24

This example includes the elements of example 23, wherein generating the verification signature includes performing a selected signature operation on each message element included in the received signature a respective number of times related to a value of each message element.

Example 25

This example includes the elements of example 22, wherein the received signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 26

This example includes the elements of example 24, wherein the respective number of times corresponds to a difference between a maximum possible value of each message element and the value of the respective message element plus 1.

Example 27

This example includes the elements of example 11, wherein the signer device is relatively less capable or relatively more capable than a verifier device.

Example 28

According to this example, there is provided a hash-based signature system. The hash-based signature system includes a signer device; a verifier device; and a network. The signer device includes hash signature control logic and signer signature logic. The hash signature control logic is to retrieve a first nonce, to concatenate the first nonce and a message to be transmitted and to determine whether a first message representative satisfies a target threshold. The signer signature logic is to generate a first transmitted signature based, at least in part, on the first message representative, if the first message representative satisfies the target threshold. The hash signature control logic is further to retrieve a second nonce, concatenate the second nonce and the message to be transmitted and to determine whether a second message representative satisfies the target threshold, if the first message representative does not satisfy the target threshold.

Example 29

This example includes the elements of example 28, wherein the signer device further includes a nonce logic to generate the first nonce.

Example 30

This example includes the elements of example 28, wherein the signer device further includes message hash logic to hash the concatenated first nonce and message to be transmitted to generate the first message representative.

Example 31

This example includes the elements of example 28, wherein the signer device further includes a communication interface to transmit the first nonce, the message to be transmitted and the first transmitted signature, if the first message representative satisfies the target threshold.

Example 32

This example includes the elements according to any one of examples 28 through 31, wherein generating the first transmitted signature includes performing a selected signature operation on each private key element of a private key a respective number of times related to a value of each message element included in the first message representative.

Example 33

This example includes the elements according to any one of examples 28 through 31, wherein the first transmitted signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 34

This example includes the elements according to any one of examples 28 through 31, wherein the target threshold is in the range of 0.5 to 0.7 or is in the range of 0.3 to 0.5.

Example 35

This example includes the elements of example 32, wherein each message element includes 2, 4 or 16 bits.

Example 36

This example includes the elements of example 32, wherein the first message representative includes 35 or 68 message elements.

Example 37

This example includes the elements of example 29, wherein the nonce logic includes a pseudorandom number generator to provide a plurality of random numbers with a uniform distribution.

Example 38

This example includes the elements according to any one of examples 28 through 31, wherein the verifier device includes verifier signature logic to receive a received signature, a received nonce and a received message and to determine whether a verification signature corresponds to a public key, the verification signature related to the received signature.

Example 39

This example includes the elements of example 38, wherein the verifier signature logic is to generate the verification signature based, at least in part, on the received signature and based, at least in part, on the received message representative.

Example 40

This example includes the elements of example 39, wherein generating the verification signature includes performing a selected signature operation on each message element included in the received signature a respective number of times related to a value of each message element.

Example 41

This example includes the elements of example 38, wherein the received signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 42

This example includes the elements of example 40, wherein the respective number of times corresponds to a difference between a maximum possible value of each message element and the value of the respective message element plus 1.

Example 43

This example includes the elements according to any one of examples 28 through 31, wherein the signer device is relatively less capable or relatively more capable than the verifier device.

Example 44

According to this example, there is provided a computer readable storage device. The computer readable storage device having stored thereon instructions that when executed by one or more processors result in the following operations including: retrieving a first nonce; concatenating the first nonce and a message to be transmitted; determining whether a first message representative satisfies a target threshold; and generating a first transmitted signature based, at least in part, on the first message representative, if the first message representative satisfies the target threshold. The instructions that when executed by one or more processors result in the following additional operations including retrieving a second nonce; concatenating the second nonce and the message to be transmitted and determining whether a second message representative satisfies the target threshold, if the first message representative does not satisfy the target threshold.

Example 45

This example includes the elements of example 44, wherein the instructions that when executed by one or more processors results in the following additional operations including generating the first nonce.

Example 46

This example includes the elements of example 44, wherein the instructions that when executed by one or more processors results in the following additional operations including hashing the concatenated first nonce and message to be transmitted to generate the first message representative.

Example 47

This example includes the elements of example 44, wherein the instructions that when executed by one or more processors results in the following additional operations including transmitting the first nonce, the message to be transmitted and the first transmitted signature, if the first message representative satisfies the target threshold.

Example 48

This example includes the elements according to any one of examples 44 through 47, wherein generating the first transmitted signature includes performing a selected signature operation on each private key element of a private key a respective number of times related to a value of each message element included in the first message representative.

Example 49

This example includes the elements according to any one of examples 44 through 47 wherein the first transmitted signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 50

This example includes the elements according to any one of examples 44 through 47, wherein the target threshold is in the range of 0.5 to 0.7 or is in the range of 0.3 to 0.5.

Example 51

This example includes the elements of example 48, wherein each message element includes 2, 4 or 16 bits.

Example 52

This example includes the elements of example 48, wherein the first message representative includes 35 or 68 message elements.

Example 53

This example includes the elements of example 45, wherein the instructions that when executed by one or more processors results in the following additional operations including: providing a plurality of random numbers with a uniform distribution.

Example 54

This example includes the elements according to any one of examples 44 through 47, wherein the instructions that when executed by one or more processors results in the following additional operations including: transmitting the first transmitted signature, the first nonce and the message to be transmitted; verifying a received signature; and coupling a signer device and a verifier device.

Example 55

This example includes the elements of example 54, wherein the instructions that when executed by one or more processors results in the following additional operations including: receiving the received signature, a received nonce and a received message; and determining whether a verification signature corresponds to a public key, the verification signature related to the received signature.

Example 56

This example includes the elements of example 55, wherein the instructions that when executed by one or more processors results in the following additional operations including: generating the verification signature based, at least in part, on the received signature and based, at least in part, on the received message representative.

Example 57

This example includes the elements of example 56, wherein generating the verification signature includes performing a selected signature operation on each message element included in the received signature a respective number of times related to a value of each message element.

Example 58

This example includes the elements of example 55, wherein the received signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 59

This example includes the elements of example 57, wherein the respective number of times corresponds to a difference between a maximum possible value of each message element and the value of the respective message element plus 1.

Example 60

This example includes the elements according to any one of examples 44 through 47, wherein a signer device is relatively less capable or relatively more capable than a verifier device.

Example 61

According to this example, there is provided a hash-based signature device. The hash-based signature device includes means for retrieving, by hash signature control logic, a first nonce; means for concatenating, by the hash signature control logic, the first nonce and a message to be transmitted; means for determining, by the hash signature control logic, whether a first message representative satisfies a target threshold; and means for generating, by signer signature logic, a first transmitted signature based, at least in part, on the first message representative, if the first message representative satisfies the target threshold. The device further includes means for retrieving, by the hash signature control logic, a second nonce, means for concatenating, by the hash signature control logic, the second nonce and the message to be transmitted and means for determining, by the hash signature control logic, whether a second message representative satisfies the target threshold, if the first message representative does not satisfy the target threshold.

Example 62

This example includes the elements of example 61, and further includes means for generating, by a nonce logic, the first nonce.

Example 63

This example includes the elements of example 61, and further includes means for hashing, by message hash logic, the concatenated first nonce and message to be transmitted to generate the first message representative.

Example 64

This example includes the elements of example 61, and further includes means for transmitting, by a communication interface, the first nonce, the message to be transmitted and the first transmitted signature, if the first message representative satisfies the target threshold.

Example 65

This example includes the elements according to any one of examples 61 through 64, wherein means for generating the first transmitted signature includes means for performing a selected signature operation on each private key element of a private key a respective number of times related to a value of each message element included in the first message representative.

Example 66

This example includes the elements according to any one of examples 61 through 64, wherein the first transmitted signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 67

This example includes the elements according to any one of examples 61 through 64, wherein the target threshold is in the range of 0.5 to 0.7 or is in the range of 0.3 to 0.5.

Example 68

This example includes the elements of example 65, wherein each message element includes 2, 4 or 16 bits.

Example 69

This example includes the elements of example 65, wherein the first message representative includes 35 or 68 message elements.

Example 70

This example includes the elements of example 62, and further includes means for providing, by a pseudorandom number generator, a plurality of random numbers with a uniform distribution.

Example 71

This example includes the elements according to any one of examples 61 through 64, and further includes means for transmitting, by a signer device, the first transmitted signature, the first nonce and the message to be transmitted; means for verifying, by a verifier device, a received signature; and means for coupling, by a network, the signer device and the verifier device.

Example 72

This example includes the elements of example 71, and further includes means for receiving, by verifier signature logic, the received signature, a received nonce and a received message; and means for determining, by the verifier signature logic, whether a verification signature corresponds to a public key, the verification signature related to the received signature.

Example 73

This example includes the elements of example 72, and further includes means for generating, by the verifier signature logic, the verification signature based, at least in part, on the received signature and based, at least in part, on the received message representative.

Example 74

This example includes the elements of example 73, wherein generating the verification signature includes performing a selected signature operation on each message element included in the received signature a respective number of times related to a value of each message element.

Example 75

This example includes the elements of example 71, wherein the received signature is generated using a hash-based signature scheme, the hash-based signature scheme selected from the group including a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

Example 76

This example includes the elements of example 74, wherein the respective number of times corresponds to a difference between a maximum possible value of each message element and the value of the respective message element plus 1.

Example 77

This example includes the elements according to any one of examples 61 through 64, wherein the signer device is relatively less capable or relatively more capable than a verifier device.

Example 78

According to this example, there is provided a system. The system includes at least one device arranged to perform the method of any one of examples 11 to 27.

Example 79

According to this example, there is provided a device. The device includes means to perform the method of any one of examples 11 to 27.

Example 80

According to this example, there is provided a computer readable storage device. The device having stored thereon instructions that when executed by one or more processors result in the following operations including: the method according to any one of examples 11 through 27.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A signer device comprising:
   hash signature control circuitry to retrieve a first nonce, to concatenate the first nonce and a message to be transmitted and to determine whether a first message representative satisfies a target threshold indicative of a resource cost associated with generating a signature based on the first message representative, wherein the first message representative is based at least in part on the first nonce and on the message to be transmitted; and
   signer signature circuitry to generate, responsive to a determination that the first message representative satisfies the target threshold, a first transmitted signature based at least in part on the first message representative;
   the hash signature control circuitry further to, responsive to a determination that the first message representative does not satisfy the target threshold: retrieve a second nonce, concatenate the second nonce and the message to be transmitted, and determine whether a second message representative satisfies the target threshold.

2. The signer device of claim 1, further comprising nonce circuitry to generate the first nonce.

3. The signer device of claim 1, further comprising message hash circuitry to hash the concatenated first nonce and the message to be transmitted to generate the first message representative.

4. The signer device of claim 1, further comprising a communication interface to transmit, responsive to a determination that the first message representative satisfies the target threshold: the first nonce, the message to be transmitted, and the first transmitted signature.

5. The signer device of claim 1, wherein generating the first transmitted signature comprises performing a selected signature operation on each private key element of a private key a respective number of times related to a value of each message element included in the first message representative.

6. The signer device of claim 1, wherein the first transmitted signature is generated using a hash-based signature scheme, the hash-based signature scheme selected from the group comprising a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

7. The signer device of claim 1, wherein the target threshold is in the range of 0.5 to 0.7 or is in the range of 0.3 to 0.5.

8. A computer readable storage device having stored thereon instructions that when executed by one or more hardware processors results in the following operations comprising:
retrieving a first nonce;
concatenating the first nonce and a message to be transmitted;
determining whether a first message representative satisfies a target threshold indicative of a resource cost associated with generating a signature based on the first message representative, the first message representative being based at least in part on the first nonce and on the message to be transmitted; and
generating a first transmitted signature based at least in part on the first message representative, if the first message representative satisfies the target threshold, and
responsive to determining that the first message representative does not satisfy the target threshold: retrieving a second nonce, concatenating the second nonce and the message to be transmitted, and determining whether a second message representative satisfies the target threshold.

9. The device of claim 8, further comprising generating the first nonce.

10. The device of claim 8, further comprising hashing the concatenated first nonce and the message to be transmitted to generate the first message representative.

11. The device of claim 8, further comprising transmitting, responsive to a determination that the first message representative satisfies the target threshold, the first nonce, the message to be transmitted, and the first transmitted signature.

12. The device of claim 8, wherein generating the first transmitted signature comprises performing a selected signature operation on each private key element of a private key a respective number of times related to a value of each message element included in the first message representative.

13. The device of claim 8, wherein the first transmitted signature is generated using a hash-based signature scheme, the hash-based signature scheme selected from the group comprising a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

14. The device of claim 8, wherein the target threshold is in the range of 0.5 to 0.7 or is in the range of 0.3 to 0.5.

15. The device of claim 8, further comprising transmitting the first transmitted signature, the first nonce and the message to be transmitted; verifying a received signature; and coupling a signer device and a verifier device.

16. The device of claim 15, further comprising receiving the received signature, a received nonce and a received message; and determining whether a verification signature corresponds to a public key, the verification signature related to the received signature.

17. A hash-based signature system comprising:
a signer device; and
a verifier device;
the signer device comprising:
a processor;
a memory;
hash signature control logic to retrieve a first nonce, to concatenate the first nonce and a message to be transmitted and to determine whether a first message representative satisfies a target threshold indicative of a resource cost associated with generating a signature based on the first message representative, wherein the first message representative is based at least in part on the first nonce and on the message to be transmitted; and
signer signature logic to generate, responsive to a determination that the first message representative satisfies the target threshold, a first transmitted signature based at least in part on the first message representative;
the hash signature control logic further to, responsive to a determination that the first message representative does not satisfy the target threshold:
retrieve a second nonce, concatenate the second nonce and the message to be transmitted, and determine whether a second message representative satisfies the target threshold.

18. The hash-based signature system of claim 17, wherein the signer device further comprises a nonce logic to generate the first nonce.

19. The hash-based signature system of claim 17, wherein the signer device further comprises message hash logic to hash the concatenated first nonce and the message to be transmitted to generate the first message representative.

20. The hash-based signature system of claim 17, wherein the signer device further comprises a communication interface to, responsive to a determination that the first message representative satisfies the target threshold: transmit the first nonce, the message to be transmitted, and the first transmitted signature.

21. The hash-based signature system of claim 17, wherein generating the first transmitted signature comprises performing a selected signature operation on each private key element of a private key a respective number of times related to a value of each message element included in the first message representative.

22. The hash-based signature system of claim 17, wherein the first transmitted signature is generated using a hash-based signature scheme, the hash-based signature scheme selected from the group comprising a Winternitz (W) one time signature (OTS) scheme, an enhanced Winternitz OTS scheme (WOTS+), a Merkle many time signature scheme, an extended Merkle signature scheme (XMSS) and/or an extended Merkle multiple tree signature scheme (XMSS-MT).

23. The hash-based signature system of claim 17, wherein the target threshold is in the range of 0.5 to 0.7 or is in the range of 0.3 to 0.5.

24. The hash-based signature system of claim 17, wherein the verifier device comprises verifier signature logic to receive a received signature, a received nonce and a received message and to determine whether a verification signature corresponds to a public key, the verification signature related to the received signature.

25. The hash-based signature system of claim 17, wherein the signer device is more resource-constrained or less resource-constrained than the verifier device.

* * * * *